G. S. BAKER.
MACHINE FOR TREATING DOUGH AND LIKE MATERIALS.
APPLICATION FILED JUNE 19, 1909.
941,296.
Patented Nov. 23, 1909.
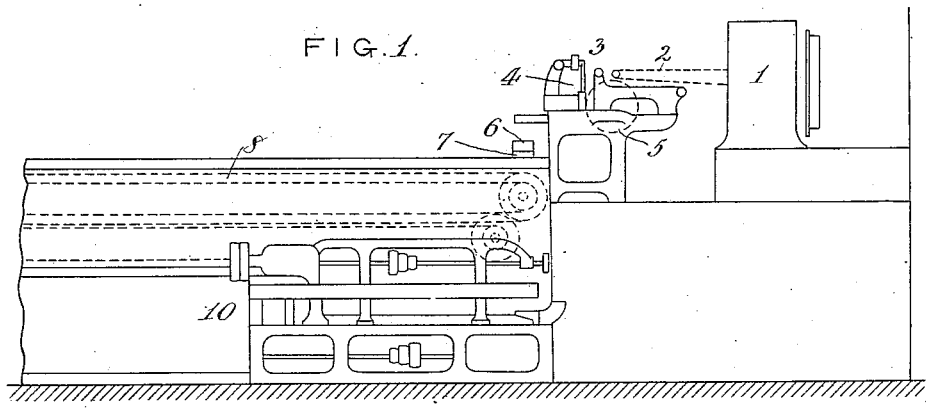
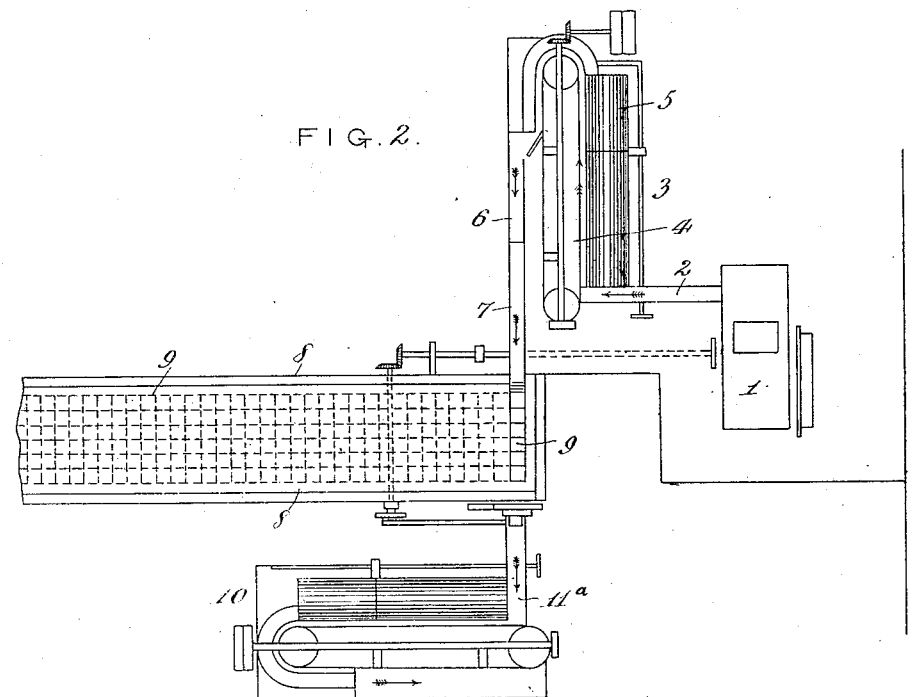

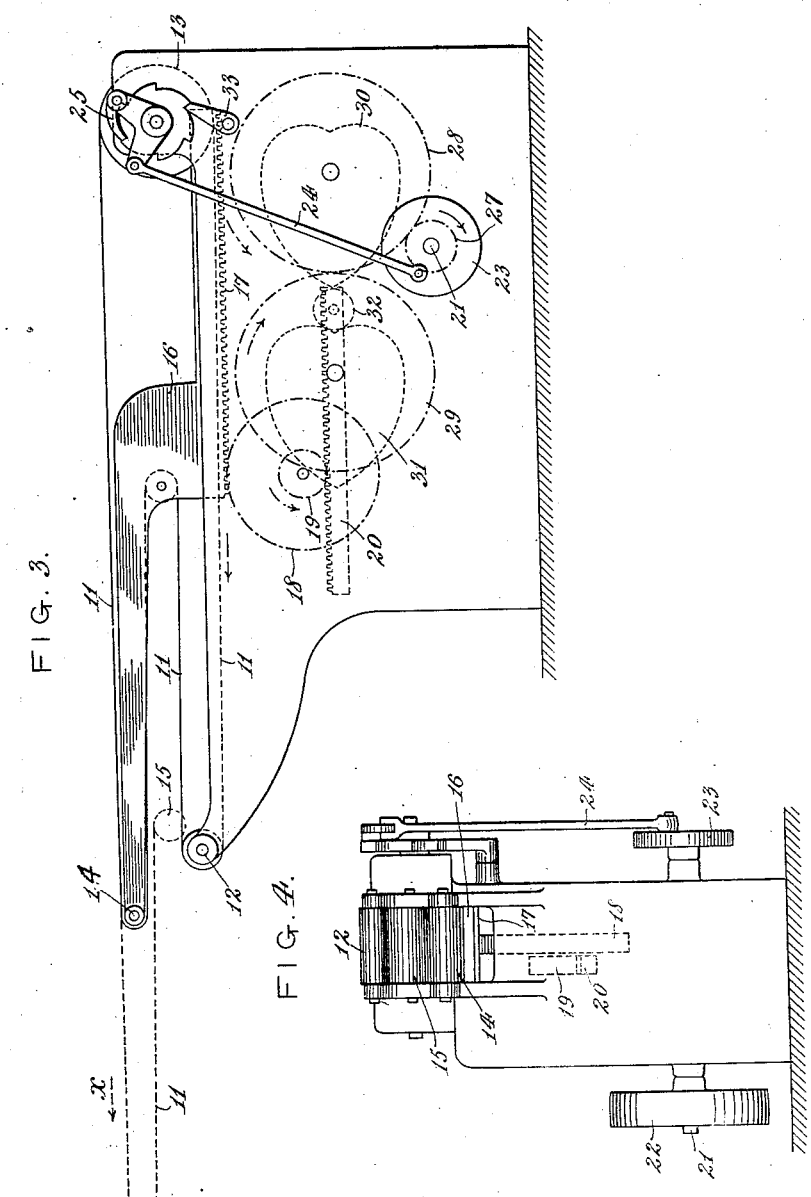

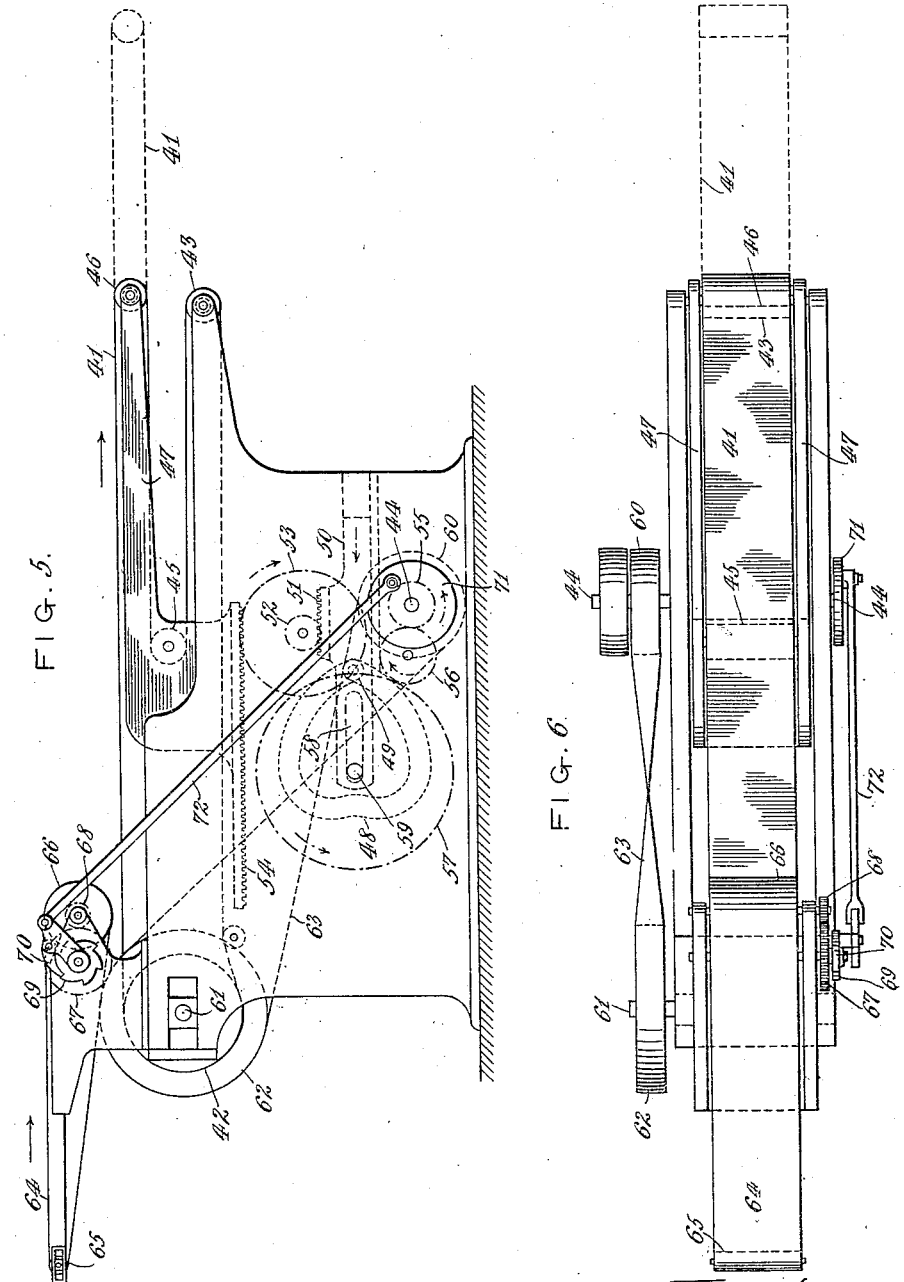

G. S. BAKER.
MACHINE FOR TREATING DOUGH AND LIKE MATERIALS.
APPLICATION FILED JUNE 19, 1909.
941,296.
Patented Nov. 23, 1909.
4 SHEETS—SHEET 4.
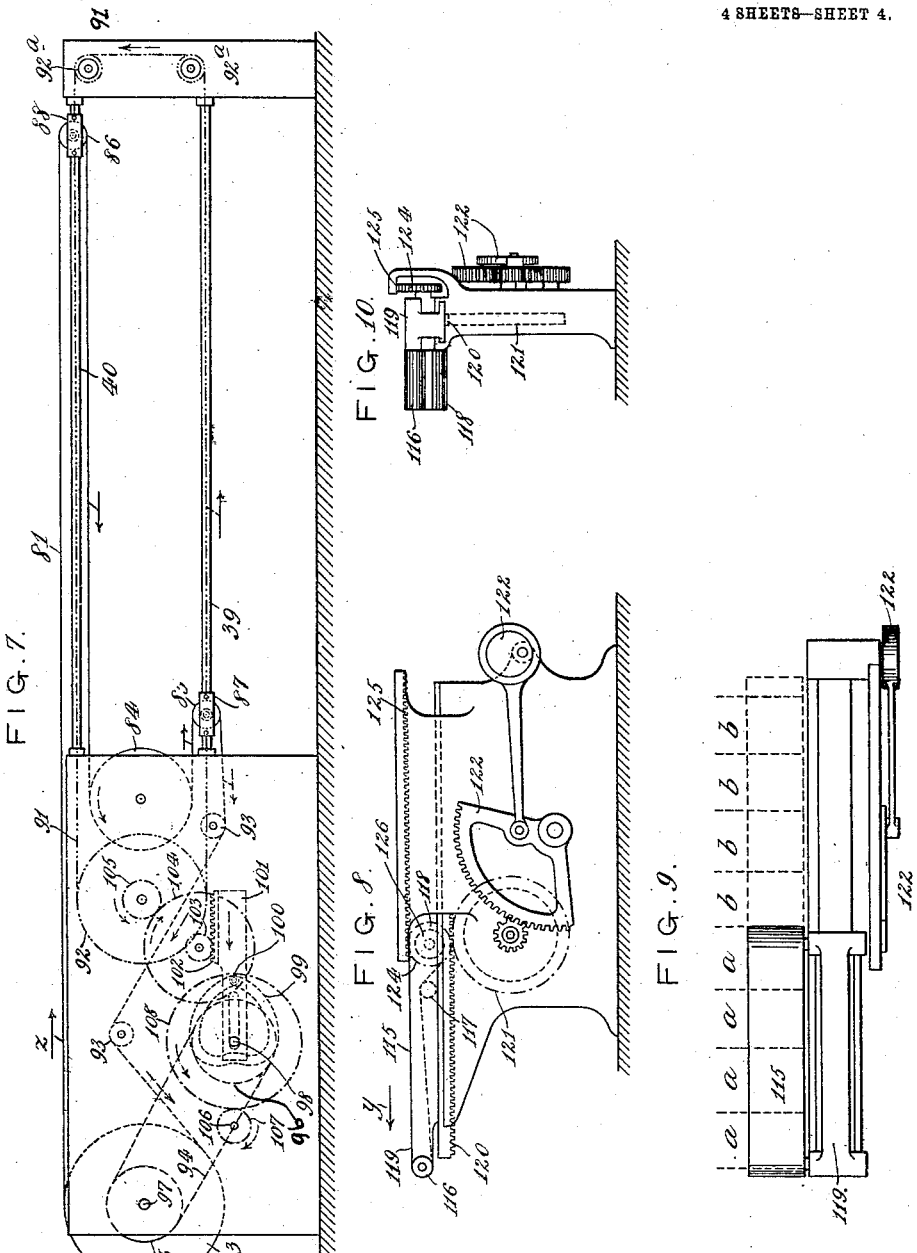

UNITED STATES PATENT OFFICE.

GEORGE SAMUEL BAKER, OF LONDON, ENGLAND.

MACHINE FOR TREATING DOUGH AND LIKE MATERIALS.

941,296.

Specification of Letters Patent. Patented Nov. 23, 1909.

Application filed June 19, 1909. Serial No. 503,069.

*To all whom it may concern:*

Be it known that I, GEORGE SAMUEL BAKER, a subject of the King of England, residing at Willesden Junction, London, N. W., England, have invented certain new and useful Improvements in Machines for Treating Dough and Like Materials, of which the following is a specification.

This invention comprises improvements in and relating to machines for treating dough and like materials and includes the combination of a machine for dividing the material into pieces or quantities, a machine for the preliminary molding of said pieces into the desired shape, a device or apparatus for proving the molded material and novel means for equalizing the feed of the molded articles from the preliminary molding machine and feeding said articles into the proving device. In certain cases the preliminary molding machine may be dispensed with and the divided masses delivered by the said equalizing and feed means directly to the proving device.

In the application of the invention to a bakery plant the dough divider may be of any approved construction, for instance of the rotary type, adapted to deliver say six or any other predetermined number of divided masses of material at each operation on to a conveyer belt which transfers them to the molding machine. This latter may also be of any desired or known form but it is contemplated to use one comprising an endless traveling apron and a cylinder rotating transversely to the plane or direction of movement of the apron and between which and the roller the divided masses are molded. From the molding machine the material passes on a traveling web or belt to the proving device which may also be of any approved form, for example of the type which comprises a series of rows of boxes or compartments lying transversely of an intermittently operated web; each row of boxes being equal in number to the divided masses delivered by the dividing machine.

It has been found in practice that the feed of the pieces of material in their progress from the dividing machine and through the molding machine, where such is used, becomes slightly unequal or irregular, causing the pieces to be delivered unequally or at not exactly the correct moment into the compartments of the proving device, it being necessary that this delivery should take place at the moment when said compartments are stationary. In order to obviate this disadvantage I interpose between the molding machine and the proving device or between the latter and the dividing machine when the molding machine is not used, special means for equalizing the feed of the divided pieces so that the latter are delivered to the proving device at the correct time and in such a manner as to be properly and neatly fed into each compartment of a row. These means comprise an endless web interposed in the belt or conveyer leading to the proving device and given a forward feed, for example, by means of pawl and ratchet gear operated from a crank. In some constructions the said web is mounted on two rollers in fixed bearings and on two other rollers in sliding bearings in such a manner that the portion or run thereof which carries the given number of divided pieces in substantially equally spaced relation is extended over the row of compartments of the proving device and while the latter is stationary is caused to recede at the desired speed to permit a single divided or molded or divided and molded piece to drop over the forward end or edge thereof into each compartment of a row, and then while the proving device is moving another step forward to collect a fresh supply from the conveyer and bring same into position for delivery and so on. Mechanism for producing the desired movements of the web may comprise one or more heart wheels or cams adapted to reciprocate a rack in mesh with a pinion or pinions adapted to actuate another rack in connection with a slide carrying the bearings of two of the movable rollers supporting the web so that a bight of the latter is extended or reduced in length and consequently extends or reduces the length of the actual carrying surface, the roller supporting same being also carried by a slide to produce the result described above. Means for preventing backward movement of the web may be provided, for example a retaining pawl acting in conjunction with the ratchet of the driving mechanism.

All the machines or devices comprising the plant may be driven or actuated from one main source of power and the mechanism arranged so that the operation of the various elements is properly timed for the purpose in view.

I may combine other molding proving and feed equalizing devices with the above apparatus if required where it is desirable or necessary to treat the material as above described more than once.

Examples of the invention are represented in the accompanying drawings, in which—

Figure 1 is a diagrammatic elevation of apparatus suitable for a bakery plant; Fig. 2 is a diagrammatic plan thereof. Fig. 3 is a side elevation of one form of equalizing feed device or mechanism referred to above. Fig. 4 is an end elevation of Fig. 3. Fig. 5 is a side elevation and Fig. 6 a plan view of a modified form of feed device. Fig. 7 is a side elevation of another modified form of feed device, and Figs. 8, 9 and 10 are respectively a side elevation, plan and end elevation of a still further modified form of feed device on a reduced scale compared with the previously described figures.

Referring to Figs. 1 and 2, the apparatus shown therein comprises a dough divider 1 of the rotary type from which the divided pieces are passed on to a belt conveyer 2 which transfers them to a preliminary molder 3 comprising an endless traveling apron 4 and a rotating cylinder 5 between which latter and the apron the divided pieces are passed and conveyed in the known manner to belt conveyer 6, and from the latter to the equalizing feed device 7 hereinafter described, which in Fig. 2 is shown simply as a belt for sake of clearness of illustration.

8 designates a proving device of known form comprising an endless series of boxes 9 into which the divided and molded pieces are fed from the feed device 7 and from which they may be again passed if desired to a second or final molder 10 by means of the conveyer belt 11ª.

As aforesaid all the above apparatus or devices may be driven from one source of power, but as the mechanism for this purpose forms no part of the present invention, it is not described herein and may be of any suitable construction.

Referring now to Figs. 3 and 4 the equalizing or automatic feed device, indicated at 7 in Fig. 2 comprises the endless web 11 passing around rollers 12 and 13 mounted in bearings on the frame of the device, and also passing around other rollers 14 and 15 carried by a reciprocating slide 16 having a rack 17 at its lower part with which meshes a toothed wheel 18 revolving with a pinion 19 in mesh with a rack 20 slidably mounted in the frame.

21 designates the main shaft driven from the pulley 22 and carrying a crank disk 23 which actuates through the connecting rod 24 the pawl and ratchet mechanism 25, 26, by which an intermittent movement is given to the roller 13 and consequently to the web 11 in the direction of the arrow $x$. A retaining pawl 33 prevents backward movement of the ratchet wheel 26. On the main shaft 21 is also mounted a pinion 27 meshing with a toothed wheel 28 which in turn is in gear with another toothed wheel 29 the shafts of said two wheels carrying heart shaped cams 30 and 31 respectively adapted to act upon an antifriction roller 32 carried by the rack 20.

From the above description it will be seen that by means of the driven cams 30, 31, rack 20, pinion 19, toothed wheel 18 and rack 17 the slide 16 is given remittent reciprocating movement alternately first in one direction and then in the opposite direction during the revolution of said cams. During the movement of the slide in a forward direction as indicated by the arrow $x$ in Fig. 3 the web is caused to extend into the position shown in dotted lines to a point over the farthermost box 9 of the proving device 8, or other apparatus which it may be desired to charge, and on again receding, the pieces of dough carried in spaced relation by the web 11 are caused to separately drop over the edge of the web which passes around the roller 14 into each of the boxes in turn, the feed mechanism being so timed that during the forward movement of the web the first of the number of said pieces is in correct position to so drop into the farthermost box and the general actuating mechanism being also so timed that the receding movement of the web takes place while the boxes of the proving device are stationary, and the web is receiving another set while the proving device is moving to bring another series of boxes into receiving position.

Figs. 5 and 6 show a construction in which the web 41 is given a continuous forward independent feed movement at the same or approximately the same speed as its forward reciprocating movement during both its forward and backward strokes instead of a general intermittent feed during its return stroke only as in the construction above described. The web 41 is mounted on rollers 42 and 43 in fixed bearings in the machine frame and on rollers 45 and 46 on the slide 47. A simplified form of driving mechanism is adopted for reciprocating said slide, this mechanism comprising a single heart shaped box cam 48 in the groove of which travels a roller 49 mounted on the slide 50 which imparts movement through rack 51, pinion 52 and spur wheel 53 to the rack 54 of slide 47. The cam is driven from the pulley shaft 44 by the train of gearing 55, 56 and 57 and the slide 50 is slotted as at 58 for passage of the cam shaft 59 on which it is also guided. For imparting the desired continuous independent feed movement to the web 41 in the forward direction indicated by the arrow at the same speed as the forward reciprocating movement I may provide as an example the shaft 44 with a pulley 60 and the shaft 61 of the roller 42 with also a pulley 62, said pulleys being connected by a crossed belt 63. To feed the pieces of dough to the web 41 in proper spaced relation as they come from the dividing or molding machine, there may be provided the intermittently operated web 64 mounted above one end of the web on rollers 65 and 66 and given intermittent movement at the required speed for example by the spur gear 67, 68 driven by ratchet and pawl mechanism 69, 70, operated from the pulley shaft 44 by means of the disk 71 and rod 72. It will thus be seen that the pieces delivered at the proper distances apart on to the intermittently moving web 64 are dropped from the latter onto the continuously moving web 41, and are fed and discharged into the proving or other apparatus in the manner previously described.

Referring now to Fig. 7 which shows a construction for economizing space in connection with apparatus of this kind whereby it is possible to provide an active web surface of greatly increased length without increasing the actual longitudinal dimensions of the machine, the web 81 is not mounted on a reciprocating slide as formerly but passes about rollers 83 and 84 having fixed bearings in the frame and about other rollers 85 and 86 carried by sliding blocks 87 and 88 respectively mounted to run on rods or guides 39 and 40 of which there may be two pairs side by side. The said blocks are connected together by a chain, wire rope of equivalent 91 which passes at one end about a driving pulley or wheel 92 and at the other end about guide pulleys $92^a$, $92^a$. The web 81 is also guided in its course by other pulleys or rollers 93, 93 and is driven continuously in a forward direction indicated by the arrow $z$ by means of a belt or chain 94 passing about pulleys 95 and 96 on the shaft 97 of roller 83 and on the cam shaft 98 respectively. The necessary reciprocating movement is imparted to the web 81 by the chain 91 and blocks 87, 88 for example by means of a heart shaped cam 99 in the groove of which runs a roller 100 carried by a slide 101 having a rack 102 which drives a train of gearing 103, 104, 105, the latter of which is mounted on the shaft of the aforesaid pulley or wheel 92. 106 indicates the driving shaft which actuates the cam shaft 98 and consequently the web 81 through the spur gear 107, 108. The directions of movement of the various parts are shown by means of arrows. The web 81 of this construction may be fed at intervals from the molding or dividing machine by any convenient means, or an intermittently moving web similar to 64 of the construction shown in Figs. 5 and 6 may be applied to or used in conjunction with this form of apparatus. It will be obvious from the above description that the web 81 will always have an independent feed movement in a forward direction and will be reciprocated in the required manner for the discharge of the pieces being always held taut by the "give and take" movement of the blocks 87, 88 and chain 91. The pieces as they drop over the forward edge of the web on the return stroke of the latter may drop onto a transversely disposed inclined board or feeding band or roller or any suitable device (not shown) which conducts them to the compartments or trays of the proving or other apparatus. It will also be obvious that compared with the form shown in Figs. 5 and 6, the form shown in Fig. 7 presents a much longer surface of web available for use in comparison to the longitudinal space occupied by the machine.

In the modification of the automatic feed device shown in Figs. 8, 9 and 10 the web 115 moves as a whole in the known manner and passes around rollers 116, 117 and 118 all carried by a slide 119 having at its base a rack 120 in mesh with a toothed wheel 121 driven, to produce a reciprocating movement, by quadrant pinion and eccentric mechanism 122 or by any other appropriate means. The slide 119 also carries a toothed wheel 124 gearing with a fixed rack 125 carried by the frame and including a clutch or ratchet device 126 which acts only on the rearward or return stroke of the slide 119. The action of this form of the device is as follows. When the slide 119 and consequently the web 115 are in their rearward positions shown in dotted lines in Fig. 9 the pieces of dough (viz: four in the example illustrated) are fed onto said web, whereupon the slide and web are carried forward (in the direction of arrow $y$ Fig. 8) by the mechanism 122, wheel 121 and rack 120 into the desired position over the proving or other apparatus to be charged. During this movement the clutch or ratchet 126 is out of action so that no independent feed movement of the web 115 takes place, but on the return of the slide said clutch is brought into action and by means of the toothed wheel 124 and rack 125 the web is given a continuous forward movement whereby the pieces of dough are fed into the receptacles of the proving apparatus $a, a, a, a$. While the slide 119 is at rest in its forward position, four more pieces of dough drop direct into the prover receptacles $b, b, b, b$, thereby giving a total number of eight pieces, delivered into each row of the prover boxes.

I do not limit myself to the constructions herein described and shown in the drawings, since the same may be varied within limits determined by the following claims without departing from the spirit of the invention.

What I claim as my invention and desire to secure by Letters Patent of the United States is:—

1. In a machine for treating dough and like materials the combination of an endless feed conveyer, driven means for imparting remittent reciprocating movement to said conveyer, means for imparting an independent forward movement to said conveyer whereby divided masses of material are fed over its forward end during its return stroke, a separate endless web adapted to convey masses of material in spaced relation to said conveyer and means for imparting an intermittent forward movement to said web.

2. In a machine for treating dough and like materials the combination of a dividing apparatus, a proving apparatus, an endless feed conveyer intermediate the dividing and proving apparatus, means for feeding the divided masses of material from the dividing apparatus to said conveyer, means for imparting reciprocating movement to the conveyer and means for imparting an independent forward movement to said conveyer whereby the divided masses of material are fed over the forward end thereof into the proving apparatus during the return stroke of the reciprocating movement of said conveyer.

3. In a machine for treating dough and like materials the combination of a dividing apparatus, a molding apparatus, means for feeding the divided masses of material from the dividing apparatus to the molding apparatus, a proving apparatus, an endless feed conveyer intermediate the molding and proving apparatus, means for feeding the divided and molded masses of material from the molding apparatus to the feed conveyer, means for imparting reciprocating movement to the conveyer and means for imparting an independent forward movement to said conveyer whereby the divided masses of material are fed over the forward end thereof into the proving apparatus during the return stroke of the reciprocating movement of said conveyer.

4. A machine of the character described having an endless feed conveyer, driven means for imparting remittent reciprocatory movement to said conveyer, the movements so imparted alternating first in one direction and then in a reverse direction, and means for imparting an independent uni-directional movement to said conveyer throughout the remittent reciprocatory movement thereof whereby divided masses of material supplied upon the conveyer are successively fed over its forward end during the return stroke of its reciprocatory movement.

In witness whereof I have signed this specification in the presence of two witnesses.

GEORGE SAMUEL BAKER.

Witnesses:
WM. O. BROWN,
F. C. SMITH.